US008177370B2

(12) United States Patent
Thiebaud et al.

(10) Patent No.: US 8,177,370 B2
(45) Date of Patent: May 15, 2012

(54) METHOD TO DISPLAY IMAGES WITH METAMERIC JAMMING TO PREVENT ILLEGAL COPY

(75) Inventors: Sylvain Thiebaud, Noyal sur Vilaine (FR); Jean-Ronan Vigouroux, Rennes (FR); Jean-Jacques Sacre, Chateaugiron (FR)

(73) Assignee: Thomson Licensing, Issy-les-Moulineaux (FR)

( * ) Notice: Subject to any disclaimer, the term of this patent is extended or adjusted under 35 U.S.C. 154(b) by 322 days.

(21) Appl. No.: 12/450,086

(22) PCT Filed: Feb. 20, 2008

(86) PCT No.: PCT/EP2008/052090
§ 371 (c)(1),
(2), (4) Date: Sep. 10, 2009

(87) PCT Pub. No.: WO2008/110443

PCT Pub. Date: Sep. 18, 2008

(65) Prior Publication Data
US 2010/0033684 A1    Feb. 11, 2010

(30) Foreign Application Priority Data

Mar. 13, 2007  (EP) .................................... 07300858

(51) Int. Cl.
*G03B 21/00* (2006.01)
(52) U.S. Cl. ................. 353/31; 353/20; 353/30; 353/33; 353/84; 353/98; 353/99; 353/119; 353/121; 353/122

(58) Field of Classification Search .................... 353/20, 353/30, 31, 33, 84, 98, 99, 119, 121, 122; 382/100, 154, 162, 167, 254, 284; 359/566, 359/571, 572, 57, 291, 292, 295; 380/201
See application file for complete search history.

(56) References Cited

U.S. PATENT DOCUMENTS

| 6,985,163 | B2 * | 1/2006 | Riddle et al. ................... 345/690 |
| 6,985,294 | B1 * | 1/2006 | Rosenthal et al. ............. 359/573 |
| 7,155,068 | B2 * | 12/2006 | Zhang et al. ................... 382/284 |
| 7,386,125 | B2 * | 6/2008 | Bilobrov et al. ............... 380/201 |
| 7,393,108 | B2 * | 7/2008 | Ohnishi ........................... 353/30 |
| 7,634,134 | B1 * | 12/2009 | So ................................... 382/173 |
| 2003/0234911 | A1 | 12/2003 | Horvath et al. |
| 2004/0100589 | A1 | 5/2004 | Ben-David et al. |
| 2006/0152524 | A1 * | 7/2006 | Miller et al. ................... 345/589 |

FOREIGN PATENT DOCUMENTS

| WO | WO 2004/040899 | 5/2004 |
| WO | WO 2005/027529 | 3/2005 |
| WO | WO 2006/076174 | 7/2006 |

OTHER PUBLICATIONS

EP Search Report Dated Sep. 13, 2007. International Search Report Dated May 23, 2008.

* cited by examiner

*Primary Examiner* — Georgia Y Epps
*Assistant Examiner* — Sultan Chowdhury
(74) *Attorney, Agent, or Firm* — Myers Wolin, LLC

(57) ABSTRACT

Method to display an image using four or more primaries having different spectral distributions that are distributed into three groups of primaries, wherein, in a visual color space, all primaries belonging to the same group have the same visual color and are metamehc. Each image being got from a combination of three primary images and each primary image being associated with each visual color of a group, the different primaries of each group are spatially or sequentially distributed over the primary image associated with this group, then allowing an efficient anti-copy protection based on metamerization of images, without any supplemental video processing.

7 Claims, 2 Drawing Sheets

METHOD TO DISPLAY IMAGES WITH METAMERIC JAMMING TO PREVENT ILLEGAL COPY

This application claims the benefit, under 35 U.S.C. §365 of International Application PCT/EP2008/052090, filed Feb. 20, 2008, which was published in accordance with PCT Article 21(2) on Sep. 18, 2008 in English and which claims the benefit of European patent application No. 07300858.3, filed Mar. 13, 2007.

The invention relates to a method to display images that provides an efficient anti-copy protection based on metamerization of spatial or sequential portions of images or sequences of images.

Colour images are generally displayed using three primaries: red, green and blue; the document WO2006/076174 (KODAK) discloses a display device having four primaries that are capable of producing metamerically matched color stimuli; portions of an image or of a series of images (image sequence) are processed such that visually equivalent colors in two or more of these image portions are displayed using this display device by different combinations of primaries that differ globally in their spectral distribution.

Metameric colors are defined as colors having the same coordinates in a visual color space (i.e. the same visual color) although having different spectral wavelength distribution. Consequently, colors that are "visually" metameric will be "perceptually indistinguishable to a viewer, at least to a viewer with normal color vision. Because such metameric colors have the same coordinates in visual color spaces, as the 1931-CIE XYZ color space or the uniformly perceptual LAB or LUV color spaces, they cannot then be differentiated by the human eye, although they have different spectral distributions. By extension, colors can be considered as metameric for a given device, as an image capture device or a printing or display device, if these colors, although having different spectral distribution, have the same coordinates in a color space which is associated with this device; such a device cannot differentiate colors that are metameric for this device.

Such an image display method, when used in a projection display in a movie theater, can be very useful to defeat camcorder piracy, as disclosed in WO2006/076174 (already quoted), WO2004/040899 (Qdesign), EP1590783 (PHILIPS) and EP1414250 (SONY). In these documents, the display method requires the processing of portions of image or series of images such that visually equivalent colors in two or more of these portions are displayed by using different combinations of at least four primaries that differ globally in their spectral distribution. Consequently, this processing alters the spectral content of the images to display in a manner that is metameric to the human eye and that is hopefully not metameric to an image capture device, then allowing the prevention of illegal copy of these images by this image capture device. Such an image capture device should have preferably a spectral sensitivity that is different from the spectral sensitivity of the human eye. Consequently, the alterations of the visual images, which are imperceptible to the human eye when they are directly displayed, are indeed perceptible when they are indirectly displayed, i.e. displayed through a copy that is captured by the image capture device.

Such a processing of the images or of the series of images is a heavy drawback for the prevention of illegal copy. One object of the invention is to avoid this processing.

For this purpose, the subject of the invention is a method to display an image or a series of images using four or more primaries having different spectral distributions that are distributed into three groups of primaries, wherein all primaries belonging to the same group have the same visual color. In this visual color space, all primaries belonging to the same group are then metameric. The different primaries of the same group being metameric, it means that no color difference can be perceived by a human eye with a so-called "normal" vision, although these different primaries have actually different spectral distribution. More precisely, according to the definition of metamerism as reminded above, within each group of primaries, all primaries have the same coordinates in this visual color space. Again, "having the same coordinates" means that the color difference between the primaries of any group cannot be perceived by a human eye. For instance, if this color difference is expressed in the L*a*b* visual color space as the so-called "Euclidian distance $\Delta E$", then $\Delta E$ is inferior to 0.5.

It has to be pointed out that although US2003/234911 and US2004/100589 discloses methods to display images using four or more primaries having different spectral distributions, none of these primaries is metameric in a visual color space with another primary.

A primary corresponds to a light having a specific spectral distribution of its intensity; images to display are spatially partitioned into pixels; each pixel is spatially or sequentially divided into sub-pixels, one sub-pixel for each primary; each sub-pixel of an image is generally provided by the amplitude modulation or the temporal modulation of its associated primary.

Generally, a first group of primaries corresponds to a red visual color, a second group corresponds to a green visual color, and a third group corresponds to a blue visual color. Each group comprises at least one primary.

This display method allows advantageously an efficient anti-copy protection based on metamerization of spatial or sequential portions of images or sequences of images.

Preferably, each image is got from a combination of three primary images and each primary image is associated with the visual color of a group; then, the different primaries of each group are spatially or/and sequentially distributed over the primary image associated with this group.

When using an imaging device for each group, each primary of this group illuminates a spatial portion of this imaging device such as to get the global illumination of the whole modulating surface of this imaging device, that should preferably be equivalent to the illumination of this imaging device that is normally got from only one primary in the prior art. Consequently, no processing of the images to display, as the altering of its spectral distribution, is required to get the metamerization of spatial or temporal portions of images.

When using the same imaging device for all groups that is sequentially illuminated by each primary, each primary of a group illuminates successively this imaging device such as to get a cumulative illumination of this imaging device, that should preferably be equivalent to the illumination of this imaging device that is normally got from only one primary in the prior art. Consequently, no processing of the images to display, as the altering of its spectral distribution, is required to get the metamerization of sequential portions of images or series of images.

A combination of both methods, as using the same imaging device for some groups and using different imaging devices for the other groups, can be used without departing from the invention.

Preferably, the visual color of one of said groups being a red color, said red group comprises a plurality of primaries. As camcorder are generally far more sensitive to red and infra-red wavelengths than the human eye, using the red color to produce metameric jamming will be very efficient, as proposed in WO2006/076174 already quoted which discloses using a deep red wavelength at about 630 nm for metameric jamming of images, which is superior to the wavelength of maximum luminance of a usual red primary which is generally around 610 nm. Preferably, the wavelength of maximum luminance of at least one primary of the group having the same visual red color is superior or equal to 630 nm. In a color projection display device, some of these primaries may be obtained by an adapted additional red and optionally infrared source. Between the light source(s) and the imager(s) of the color projection display, color filters made of sulfide or selenide glass may be advantageously used to get the required metameric red primaries.

The subject of the invention is also a display device that is able to implement a method according to the invention and that comprises a light source and means to split spatially and/or sequentially the light emitted by this light source into the said four or more primaries.

The different primaries can be spatially distributed on the surface of an imager, as on a direct view Liquid Display Device or a Plasma Panel; these primaries can be distributed on different channels as in a projection display having a beam splitter to distribute these primaries from a single light source, or having a specific light source for each primary (or a combination of both architectures); these primaries can be sequentially distributed as in a projection display having only one spatial modulation channel with a micro-imager (as a micromirror device) but a color wheel to perform this sequential distribution on the micro-imager. Spatial distribution and sequential distribution can be combined without departure from the invention.

The invention will be more clearly understood on reading the description which follows, given by way of non-limiting example and with reference to the appended figures in which.

Figure 1:
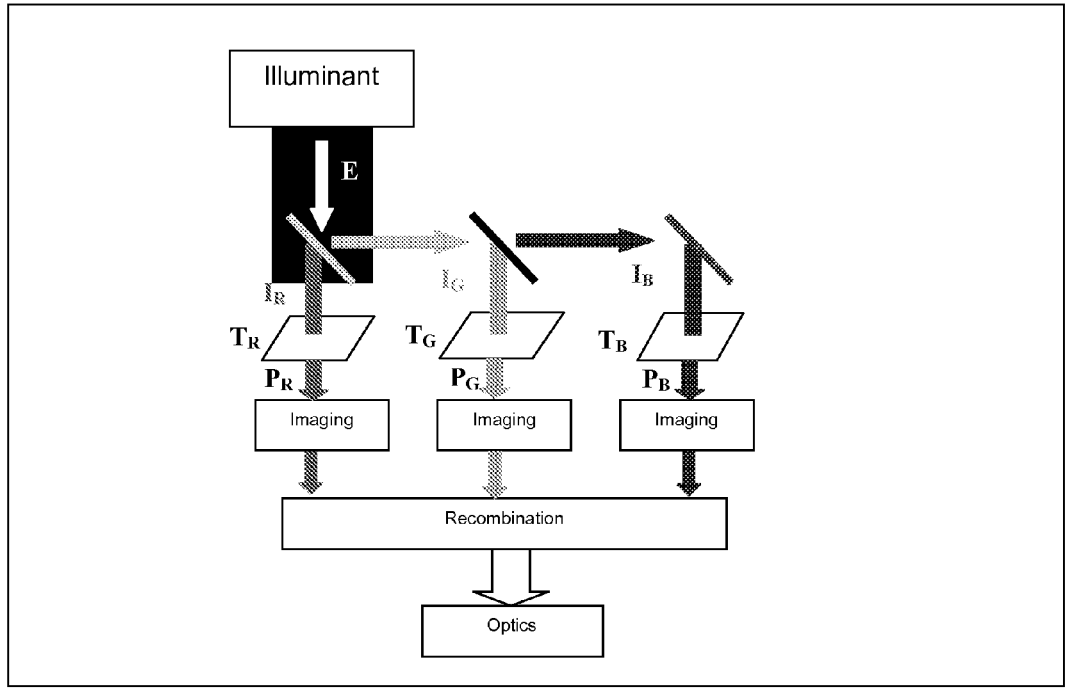
FIG. 1 is a schematic diagram of the architecture of a display device of the prior art.

A standard display device generally uses three primaries having three different visual colors: one being a red visual color, another being a green visual color, and the last one being a blue visual color. FIG. 1 shows a basic diagram of a projection display device having a light source called "illuminant", spatial or temporal splitting means to distribute the color of the light E emitted by the light source into three channels, each channel corresponding to a primary $P_R$, $P_G$, $P_B$ that illuminates an imaging device that is able to spatially modulate its illumination, and spatial (or temporal) recombination means to combine the images that are displayed by each imager so as to finally display images through adapted optics as a projection lens. Each primary $P_R$, $P_G$, $P_B$ is associated with a color filter $T_R$, $T_G$, $T_B$ having its spectral transmission characteristic $T_R(\lambda)$, $T_G(\lambda)$, $T_B(\lambda)$ that filters the light E emitted by the light source. After being filtered by a filter $T_R$, $T_G$, $T_B$, filtered light illuminates an imaging device that spatially modulates its illumination. When splitting spatially and spectrally the illumination beam I into three different beams of primary $P_R$, $P_G$, $P_B$, prisms and dichroïc color filters are generally used and the projection display device comprises three different imaging devices, one for each primary. When splitting sequentially and spectrally the illumination beam I into three successive primary $P_R$, $P_G$, $P_B$, a color wheel with color filters segments $T_R$, $T_G$, $T_B$ is generally used and the projection display device comprises generally only one imaging device that images successively under these successive primary $P_R$, $P_G$, $P_B$, the resultant successive images being then recombined by color fusion inside the eye. The imaging device(s), as the color filters, can be reflective or transmissive. Digital micromirror devices ("DMD") or liquid crystal micro-imager may be used as imaging device(s).

Figure 2:
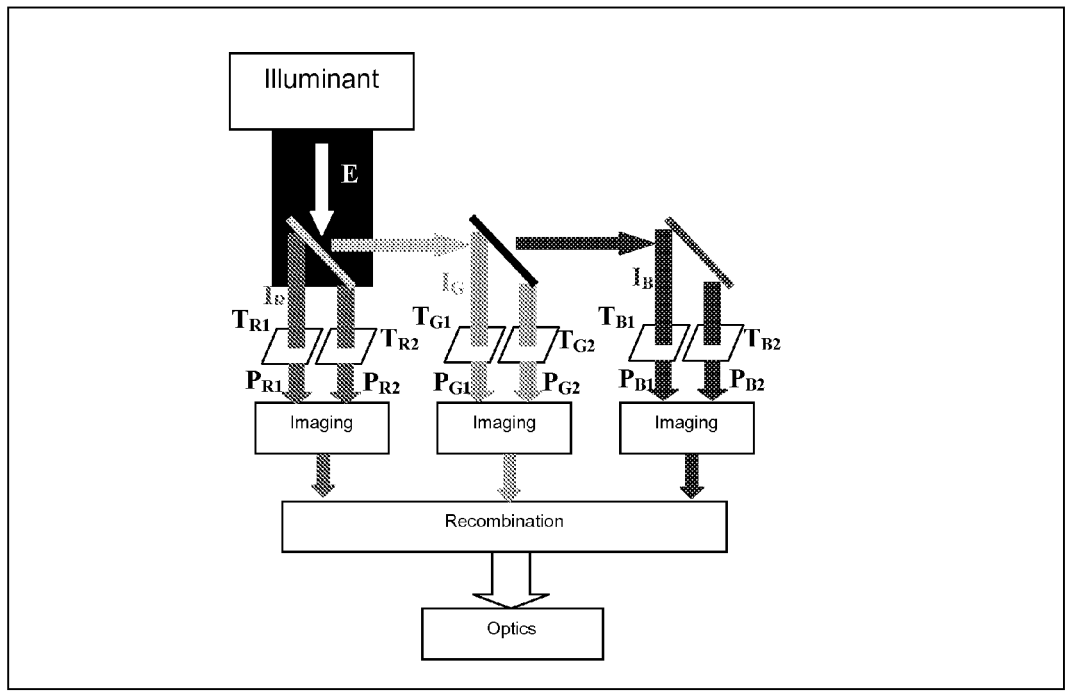
FIG. 2 is a schematic diagram of the architecture of a display device according to one embodiment of the invention, with six primaries.

A specific embodiment on such projection device will now be explained which is adapted to implement a first embodiment of the invention. FIG. 2 shows a basic diagram of an embodiment of a projection display device that is able to implement the method according to the invention and that have the same light source E called "illuminant" having its spectral distribution $E(\lambda)$, spatial or temporal splitting means to distribute the color of the light I emitted by the light source into six primaries $P_{R1}$, $P_{R2}$, $P_{G1}$, $P_{G2}$, $P_{B1}$, $P_{B2}$ having different spectral distributions, that are distributed in three groups: a red group $G_R$ comprising the $P_{R1}$ and $P_{R2}$ primaries, a green group $G_G$ comprising the $P_{G1}$ and $P_{G2}$ primaries, and a blue group $G_B$ comprising the $P_{B1}$ and $P_{B2}$ primaries. All primaries belonging to the same group have the same visual color: the red visual color of the $P_{R1}$ primary is identical to the red visual color of the $P_{R2}$ primary; the green visual color of the $P_{G1}$ primary is identical to the green visual color of the $P_{G2}$ primary; the blue visual color of the $P_{B1}$ primary is identical to the blue visual color of the $P_{B2}$ primary. Within each group, the illumination of the different primaries is spatially or sequentially distributed over the same imaging device that is able to spatially modulate its illumination. Each primary $P_{R1}$, $P_{R2}$, $P_{G1}$, $P_{G2}$, $P_{B1}$, $P_{B2}$ is associated with a color filter $T_{R1}$, $T_{R2}$, $T_{G1}$, $T_{G2}$, $T_{B1}$, $T_{B2}$ having its spectral transmission characteristic $T_{R1}(\lambda)$, $T_{R2}(\lambda)$, $T_{G1}(\lambda)$, $T_{G2}(\lambda)$, $T_{B1}(\lambda)$, $T_{B2}(\lambda)$. Other parts of the architecture of this display device are identical to the display device of FIG. 1.

If $x(\lambda)$, $y(\lambda)$, $z(\lambda)$ are the colorimetric functions of the three coordinates X, Y, Z of the 1931 CIEXYZ visual color space, then we can express the identity of visual colors within each group as follows:

in the red group $G_R$, $$\begin{cases} \sum_{400\,nm}^{700\,nm} E(\lambda) \cdot T_{R1}(\lambda) \cdot \overline{x}(\lambda) \cdot \Delta\lambda = \sum_{400\,nm}^{700\,nm} E(\lambda) \cdot T_{R2}(\lambda) \cdot \overline{x}(\lambda) \cdot \Delta\lambda \\ \sum_{400\,nm}^{700\,nm} E(\lambda) \cdot T_{R1}(\lambda) \cdot \overline{y}(\lambda) \cdot \Delta\lambda = \sum_{400\,nm}^{700\,nm} E(\lambda) \cdot T_{R2}(\lambda) \cdot \overline{y}(\lambda) \cdot \Delta\lambda \\ \sum_{400\,nm}^{700\,nm} E(\lambda) \cdot T_{R1}(\lambda) \cdot \overline{z}(\lambda) \cdot \Delta\lambda = \sum_{400\,nm}^{700\,nm} E(\lambda) \cdot T_{R2}(\lambda) \cdot \overline{z}(\lambda) \cdot \Delta\lambda \end{cases}$$

in the green group $G_G$, $$\begin{cases} \sum_{400\,nm}^{700\,nm} E(\lambda) \cdot T_{G1}(\lambda) \cdot \overline{x}(\lambda) \cdot \Delta\lambda = \sum_{400\,nm}^{700\,nm} E(\lambda) \cdot T_{G2}(\lambda) \cdot \overline{x}(\lambda) \cdot \Delta\lambda \\ \sum_{400\,nm}^{700\,nm} E(\lambda) \cdot T_{G1}(\lambda) \cdot \overline{y}(\lambda) \cdot \Delta\lambda = \sum_{400\,nm}^{700\,nm} E(\lambda) \cdot T_{G2}(\lambda) \cdot \overline{y}(\lambda) \cdot \Delta\lambda \\ \sum_{400\,nm}^{700\,nm} E(\lambda) \cdot T_{G1}(\lambda) \cdot \overline{z}(\lambda) \cdot \Delta\lambda = \sum_{400\,nm}^{700\,nm} E(\lambda) \cdot T_{G2}(\lambda) \cdot \overline{z}(\lambda) \cdot \Delta\lambda \end{cases}$$

in the blue group $G_B$, $$\begin{cases} \sum_{400\,nm}^{700\,nm} E(\lambda) \cdot T_{B1}(\lambda) \cdot \overline{x}(\lambda) \cdot \Delta\lambda = \sum_{400\,nm}^{700\,nm} E(\lambda) \cdot T_{B2}(\lambda) \cdot \overline{x}(\lambda) \cdot \Delta\lambda \\ \sum_{400\,nm}^{700\,nm} E(\lambda) \cdot T_{B1}(\lambda) \cdot \overline{y}(\lambda) \cdot \Delta\lambda = \sum_{400\,nm}^{700\,nm} E(\lambda) \cdot T_{B2}(\lambda) \cdot \overline{y}(\lambda) \cdot \Delta\lambda \\ \sum_{400\,nm}^{700\,nm} E(\lambda) \cdot T_{B1}(\lambda) \cdot \overline{z}(\lambda) \cdot \Delta\lambda = \sum_{400\,nm}^{700\,nm} E(\lambda) \cdot T_{B2}(\lambda) \cdot \overline{z}(\lambda) \cdot \Delta\lambda \end{cases}$$

The spatial or temporal distribution of the different primaries of each group on the same imaging device is adapted in a manner known per se to get the same global illumination of this imaging device as in the projection device of the prior art which was disclosed in reference to FIG. 1. Consequently, as there is no global change of the distribution of visual color on the different imaging devices in comparison with prior art, no supplemental processing of the images, as the altering of the spectral content of images, is required to display the images although a metameric effect is get that prevent illegal copy of these images.

Using the projection display device having the six primaries that has been described in reference to FIG. 2 will advantageously allow to display different metameric colors that will be perceptually indistinguishable to a viewer with normal color vision; as explained in detail in the next paragraph, such a display device is very efficient to prevent illegal copy from camcorders trying to capture the images that are displayed by this display device.

Figure 3:
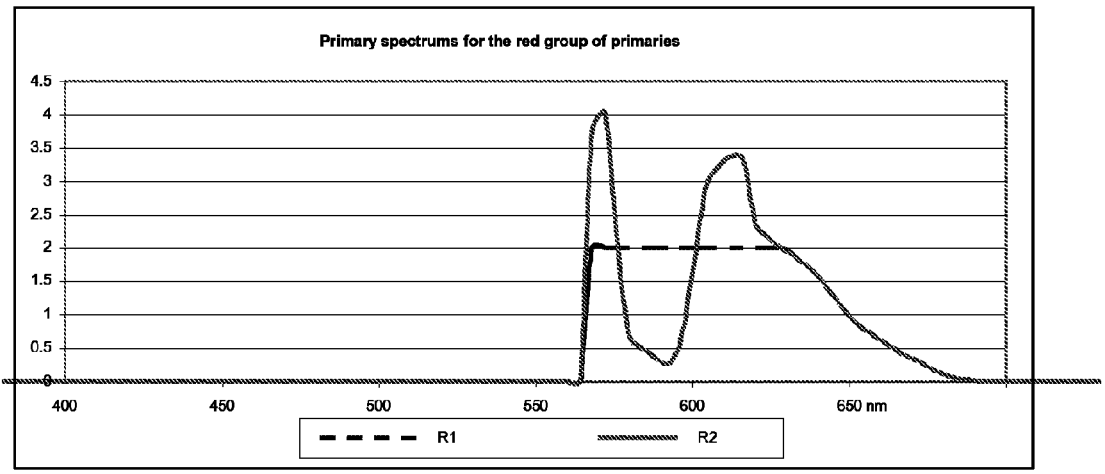
FIG. 3 illustrates, as an example, the spectral distribution of two primaries R1 and R2 belonging to the same red group of primaries, according to a second embodiment of the invention.

Effect of the Metameric Effect Get by the Invention, on a Camcorder:

In this paragraph we will approach the aspect of the effectiveness of the jamming of a camcorder or a camera which would film the image generated by using a display device having only four primaries: two primaries R1 and R2 having approximately the same red visual color although having different spectral distribution $P_R1(\lambda)$, $P_{R2}(\lambda)$ as illustrated on FIG. 3, one usual primary for the green, and one usual primary for the blue. The visual color of each primary is identical to the visual color of the corresponding primary of a standard display device, so that no specific processing of the images is necessary to display the images using the display device of the invention.

Using the colorimetric functions of the 1931CIEXYZ color space $x(\lambda), y(\lambda), z(\lambda)$, we can calculate the coordinates $X_{R1}, Y_{R1}, Z_{R1}$ of the primary R1 and the coordinates $X_R, Y_R, Z_R$ of the primary R2 in the 1931 CIEXYZ color space; we get:

$X_{R1}=33.710, Y_{R1}=22.369, Z_{R1}=0.030;$ $X_{R2}=33.710, Y_{R2}=22.371, Z_{R2}=0.030.$ $$a^* = 500 * \left[\left(\frac{X}{94,81}\right)^{1/3} - \left(\frac{Y}{100}\right)^{1/3}\right],$$

$$b^* = 200 * \left[\left(\frac{Y}{100}\right)^{1/3} - \left(\frac{Z}{107,304}\right)^{1/3}\right],$$

Using the following transform functions $$L^* = 116 * \left(\frac{Y}{100}\right)^{1/3} - 16,$$

we can infer the coordinates $L^*_{R1}, a^*_{R1}, b^*_{R1}$ of the primary R1 and the coordinates $L^*_{R2}, a^*_{R2}, b^*_{R2}$ of the primary R2 in the CIELab color space; we get:

$L^*_{R1}=54.416, a^*_{R1}=50.700, b^*_{R1}=108.261;$ $L^*_{R2}=54.418, a^*_{R2}=50.693, b^*_{R2}=108.260.$

From the equation:

$$\Delta E^* = \sqrt{(L^*_{R2} - L^*_{R1})^2 + (a^*_{R2} - a^*_{R1})^2 + (b^*_{R2} - b^*_{R1})^2},$$

we can now calculate the usual color difference between the two primaries R1 and R2 as they are perceived by the human eye when they are directly displayed by the display device; we get $\Delta E^*=0.007$, which is a too small difference that cannot be perceived by the human eye, as compared to 0.5 as being the smallest difference that the human eye can perceive. We can then conclude that the two primaries R1 and R2 have indeed the same red visual color according to the invention.

Figure 4:
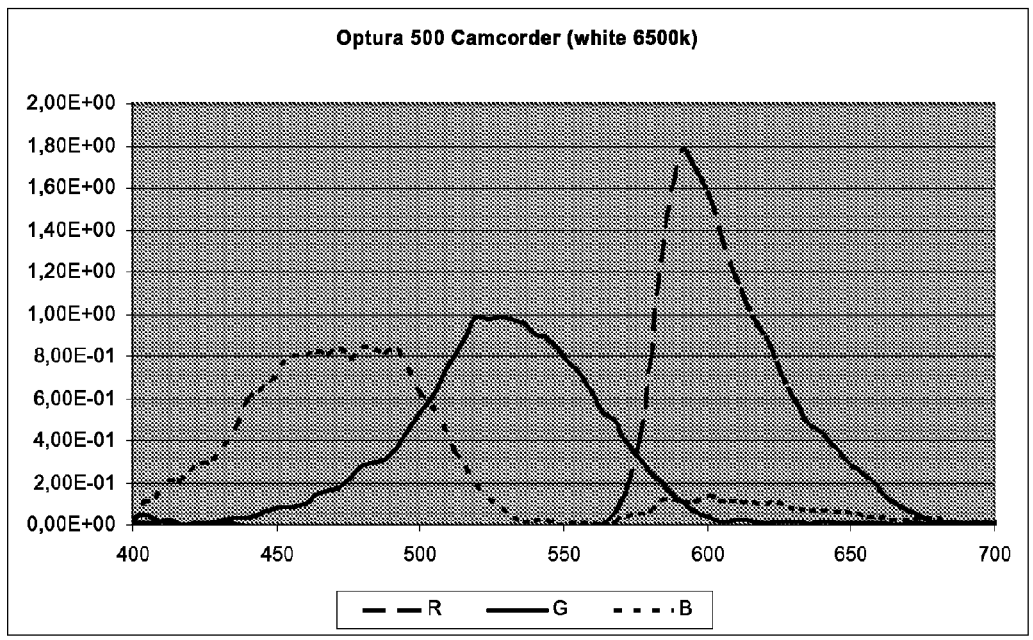
FIG. 4 illustrates, as an example, the spectral sensitivity of the three components $R_C$, $G_C$, $B_C$ of a camcorder.

We will now evidence how the two red primaries R1 and R2 are captured by a camcorder model OPTURA 500 from CANON company, having three primaries $R_C, G_C, B_C$ associated with their spectral sensitivities $R_C(\lambda), G_C(\lambda), B_C(\lambda)$ that are illustrated on FIG. 4.

Using these spectral sensitivities $R_C(\lambda), G_C(\lambda), B_C(\lambda)$, we can calculate the signals that are delivered by this camcorder: $R_{C.R1}, G_{C.R1}$ and $B_{C.R1}$ when capturing the primary R1 that is displayed by the display device, and the coordinates $R_{C.R2}, G_{C.R2}, B_{C.R2}$ when capturing the primary R2 that is displayed by the display device; we get:

$R_{C.R1}=36.65, G_{C.R1}=4.32, B_{C.R1}=3.56;$ $R_{C.R2}=31.46, G_{C.R2}=4.93, B_{C.R2}=3.39.$

CCIR recommendation gives the following transform from the RGB device-dependant color space to the 1931 CIEXYZ device independent color space:

$$\begin{bmatrix} X \\ Y \\ Z \end{bmatrix} = \begin{bmatrix} 0{,}413 & 0{,}358 & 0{,}180 \\ 0{,}2213 & 0{,}715 & 0{,}072 \\ 0{,}019 & 0{,}119 & 0{,}950 \end{bmatrix} * \begin{bmatrix} R \\ G \\ B \end{bmatrix}.$$

Using this transform, we can calculate the color coordinates of R1 and R2 in the 1931 CIEXYZ color space, as they are perceived by an observer watching a CCIR-compliant display device displaying the two primaries R1, R2 through their recording by the camcorder; we get:

$X_{C.R1}=17.33, Y_{C.R1}=11.46, Z_{C.R1}=4.59;$ $X_{C.R2}=15.37, Y_{C.R2}=10.73, Z_{C.R2}=4.40.$

From these coordinates in the 1931 CIEXYZ color space, we calculate, as previously, the coordinates of R1 and R2 in the CIELAB color space, as they are perceived by the camcorder:

$L^*_{C.R1}=40.34, a^*_{C.R1}=40.89, b^*_{C.R1}=27.17;$ $L^*_{C.R2}=39.13, a^*_{C.R2}=35.01, b^*_{C.R2}=26.06.$

Using the same equation of the color difference as above, we can now calculate the usual color difference between the two primaries R1 and R2 as they are perceived by the camcorder, i.e. as a human eye would perceive these primaries as they are recorder by the camcorder; we get $\Delta E^*_C=6.11$, which is far above the level of 0.5 that is the smallest difference that the human eye can perceive. We can then conclude that the two primaries R1 and R2 have indeed been recorded by the camcorder as having quite different visual colors.

We have now evidenced how two different primaries R1 and R2 that have the same visual colors although having different spectral distribution, i.e. that are metameric, are perceived as different colors after being captured by a professional camera. Consequently, using the four primaries of the display device to display images or series of images will allow the metamerization of images without any additional video processing of these images, then allowing the jamming of images captured by usual camcorders, and then preventing from illegal copy of these images.

It can thus be appreciated that the present invention improves upon the prior art by providing a method to display images that allow the jamming of illegal copy without degradation of the quality of display for viewers having a normal vision, and without any need of specific video processing of the images, as altering their spectral content.

It will be understood that the present invention has been described purely by way of example, and modifications of detail can be made without departing from the scope of the invention.

Each feature disclosed in the description and (where appropriate) the claims and drawings may be provided independently or in any appropriate combination.

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

Reference numerals appearing in the claims are by way of illustration only and shall have no limiting effect on the scope of the claims.

The invention claimed is:

1. A method to display a series of images using four or more primaries having different spectral distributions for an illumination of at least one imaging device that is able to spatially modulate its illumination, the method comprising:
   distributing all primaries of said four or more primaries into three groups of primaries, wherein any different primaries that belong to the same group have the same visual color and are metameric for a human visual system.

2. The method according to claim 1 wherein any different primaries that belong to the same group have the same coordinates in a given visual color space.

3. The method according to claim 1 wherein the display of each of said series of images image is got from a combination of the display of three primary images, each primary image being generated by the illumination of said at least one imaging device and being associated with the visual color of a group, wherein any different primaries of each group are spatially or sequentially distributed over the primary image associated with this group.

4. The method according to claim 1, wherein, the visual color of one of said groups being a red color, said red group comprises a plurality of primaries.

5. The method according to claim 4, wherein the wavelength of maximum luminance of at least one primary of said group having the same visual red color is superior or equal to 630 nm.

6. A display device comprising:
   a light source; and
   a beam splitter to split spatially or sequentially the light emitted by this light source into said four or more primaries,
   wherein the display device is configured to
   display a series of images using four or more primaries having different spectral distributions for an illumination of at least one imaging device that is able to spatially modulate its illumination, and configured to distribute all primaries of said four or more primaries into three groups of primaries, wherein any different primaries that belong to the same group have the same visual color and are metameric for a human visual system.

7. The display device according to claim 6 wherein the display device is further configured to display of each of said series of images from a combination of three primary images, each primary image being generated by the illumination of said at least one imaging device and being associated with the visual color of a group, wherein any different primaries of each group are spatially or sequentially distributed over the primary image associated with this group.

* * * * *